United States Patent [19]

Saunders

[11] Patent Number: 4,552,205
[45] Date of Patent: Nov. 12, 1985

[54] DUAL STORAGE HEATING AND COOLING SYSTEM

[76] Inventor: Norman B. Saunders, 15 Ellis Rd., Weston, Mass. 02193

[21] Appl. No.: 546,995

[22] Filed: Oct. 31, 1983

[51] Int. Cl.⁴ .............................................. F24D 11/00
[52] U.S. Cl. ...................................... 165/18; 126/429; 126/430
[58] Field of Search .......................... 165/18, DIG. 4; 126/428, 430, 429, 422

[56] References Cited

U.S. PATENT DOCUMENTS

| | | | |
|---|---|---|---|
| 2,680,565 | 6/1954 | Löf | 165/18 X |
| 3,262,493 | 7/1966 | Hervey | 165/18 X |
| 4,153,104 | 5/1979 | Ruder | 165/18 X |
| 4,196,719 | 4/1980 | Skrivseth | 165/18 X |
| 4,373,573 | 2/1983 | Madwed | 165/18 X |
| 4,392,417 | 7/1983 | Johannsen | 165/31 X |
| 4,402,188 | 9/1983 | Skala | 165/18 X |
| 4,410,030 | 10/1983 | Skala | 165/18 X |
| 4,420,036 | 12/1983 | Blaser | 165/45 |

Primary Examiner—William R. Cline
Assistant Examiner—Randolph A. Smith
Attorney, Agent, or Firm—Schiller & Pandiscio

[57] ABSTRACT

A solar heating and cooling system is disclosed which provides substantially consistent levels of temperature within a preselected range in an air space of an enclosed structure. The system includes a first store which functions as a heat source and a second store which functions as a heat sink. A variable feed fan is used for transmitting air through the first store and into the air space when the level of the sensed temperature within the air space drops below the preselected range. A second variable speed fan is used for transmitting air through the second store and into the air space when the level of the sensed temperature within the air space rises above the preselected range. Both fans are used to transfer heat from the warm store to the cool store when the warm store overheats. Energy may be purchased on an as needed basis or at off peak periods in anticipation of need.

13 Claims, 3 Drawing Figures

DUAL STORAGE HEATING AND COOLING SYSTEM

The present invention relates generally to solar heating and cooling systems and, more particularly, to an improved solar heating and cooling system for providing relatively constant interior temperatures of a living space within an enclosed structure.

Many passive solar heating and cooling systems have been devised for heating and cooling the interior air spaces of an enclosed structure, such as a house, so as to conserve energy produced by fossil fuels. Many of these solar energy systems, however, cannot always provide relatively constant levels of indoor temperature (particularly in colder northern climates). As a consequence, in order to avoid such large variations in the levels in indoor temperature, supplemental heating or cooling is often provided by more conventional systems of the type which operate from energy produced by fossil fuels in order to achieve relatively constant levels of indoor temperature. Thus, the heating and/or cooling by such structures is not 100% solar. While various devices are available for providing a more uniform level of temperature, such as masonry walls, water tubes, shades and windows for absorbing incoming radiation and reradiating heat into the interior spaces to increase the heat input into the interior of a room and shades and windows for reflecting unwanted radiation, such devices are often user dependent and often do not adequately or accurately control the level of temperature within the air space of the enclosed structure within which the devices are used.

It is a general object of the present invention to provide an improved heating and cooling system which overcomes or substantially reduces the problems of the prior art.

Another object of the present invention is to provide an improved solar heating and cooling system for providing relatively constant levels of indoor temperature within an enclosed structure.

And another object of the present invention is to provide a thermostatically controlled solar heating and cooling system for more accurately controlling interior temperatures of an enclosed structure.

Still another object of the present invention is to provide an improved solar heating and cooling system useful in both summer and winter.

These and other objects of the present invention are achieved by an improved heating and cooling system for use in an enclosed structure including an air space. The system comprises in combination:

a first store means for providing a source of heat and including a first heat transfer material for storing excessive heat;

a second store means for providing a heat sink and including a second heat transfer material for absorbing heat from air passing through the second store means; and temperature control means for substantially maintaining the temperature within the air space within a predetermined temperature range between first and second preselected levels of temperatures, the temperature control means including first means for transmitting air through the first store means, second means for transmitting air through the second store means, sensor means for sensing the level of temperature within the air space, wherein the temperature control means is operable in response to the sensor means in (1) a first mode for heating the air space wherein the first means for transmitting air through the first store means transmits air heated by the first store means into the air space when the temperature sensed by the sensor means drops below the first preselected level; and (2) a second mode for cooling the air space wherein the second means for transmitting air through the second store means transmits air from the air space to the second store means when the temperature level sensed by the sensor means rises above the second preselected level.

Other objects of the invention will in part be obvious and will in part appear hereinafter. The invention, accordingly, comprises the apparatus possessing the construction, combination of elements and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
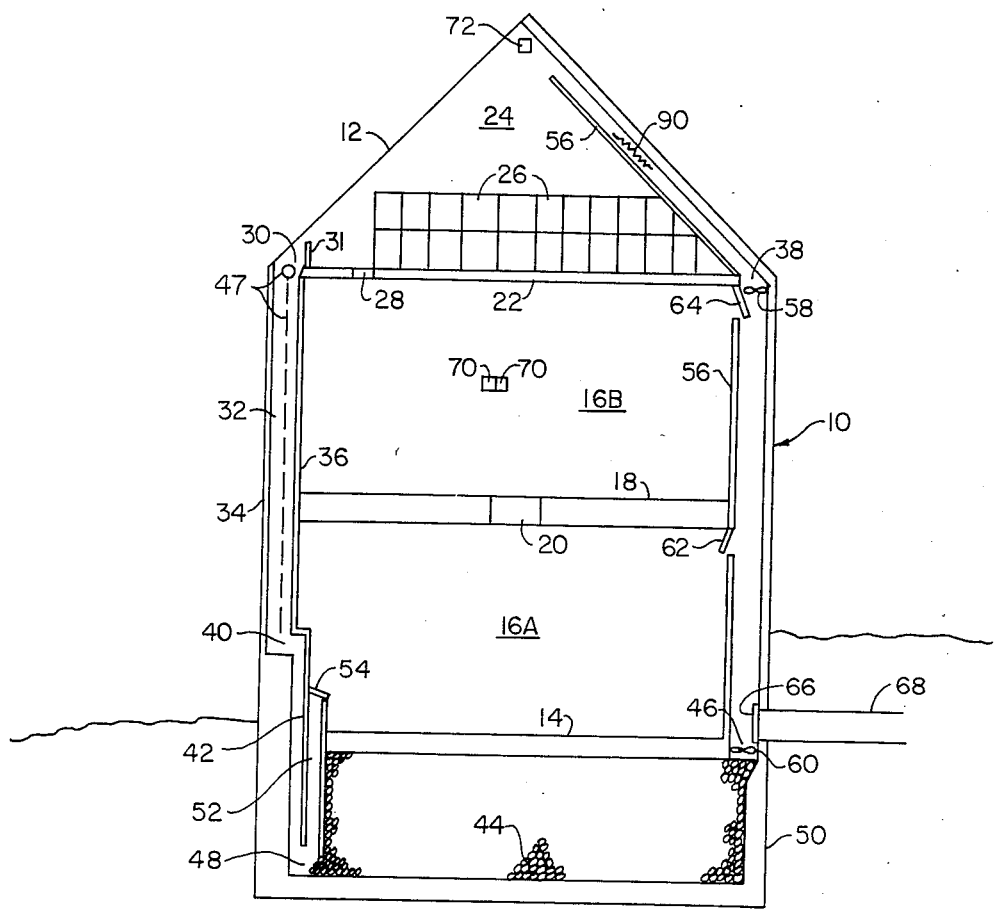
FIG. 1 illustrates a cross-sectional view through an enclosed structure having a living space and incorporating the preferred embodiment of the heating and cooling system of the present invention.

Referring to FIG. 1, the present invention is adapted to be used in an enclosed structure 10, typically having a roof 12, floor 14 and lower and upper living spaces 16A and 16B. Structure 10 is shown in the drawings as a two-story building, although it will be evident that the invention can be used in various types of structures, including single story and multistory structures. Structure 10 accordingly is shown with an intermediate floor 18 separating the living spaces 16A and 16B and having one or more openings 20, such as those provided by stairways. A ceiling 22, disposed below roof 12, forms attic space 24.

In accordance with the present invention, a first heat store 26 is provided preferably near the roof 12 in attic space 24. Alternatively, heat store can be placed in other locations, such as in a basement. Store 26 includes a heat transfer material for storing excessive heat within the structure 10. Store 26 may be any type of heat store. The amount of heat storage needed is determined, in part, by the amount of glazing and expected heat loss. For example, where the total living space 16 is about 2,000 square feet having a south facade of substantially all glazing, store 24 can include ten tons of water in well-spaced 6-to-30 gallon closed containers made of a highly thermally-conductive material such as glass, thin durable plastic or the like. The containers can be arranged in a single tier or preferably two or more tiers so as to conserve space and to give better thermal performance, since multiple tiers will ensure better thermal stratification. Most of the hot air transmitted through the store 26 passes around the containers by making contact with the uppermost portions of the uppermost containers. At typical times in winter the temperature of the uppermost portion of the store may be 90° to 120°

F., while the lowest portion may be 70° to 95° F. Air opening 28 is preferably provided in ceiling 20 for air introduced from the living space 16B into attic space 22. Another opening 30 is provided for air introduced into the attic space from the air space 32 between a pair of panels 34 and 36, as described in greater detail hereinafter. A back-draft damper 31 is preferably used for insuring that air flows in only one direction, i.e., from air space 32 into attic space 24. Opening 38 is provided for air exiting the attic space 24 through duct 56, also described in greater detail hereinafter.

The pair of panels 34 and 36 are disposed in the southern wall of the structure so as to be maximally exposed to the sun. Outer panel 34 is preferably sealed around its edges to prevent air leakage into and out of the structure. The panels are preferably disposed in a parallel spaced-apart relationship so as to provide the air space 32 therebetween. Panels 34 and 36 are preferably made of a material transmissive to solar radiation, and particularly transmissive to the visible and near infrared portions of the electromagnetic spectrum. The top of the space 32 communicates with, and is preferably coupled to the opening 30 so that air transmitted through the air space 32 can be transmitted into the attic space 24. The bottom of inner panel 36 preferably includes an opening 40 so as to provide fluid communication between space 32 and the duct 42, the latter extending to a position near the bottom of the second store 44 as described hereinafter. A suitable retractable shade 47 can be provided within space 32 and can extend the length of panels 34 and 36 so that when pulled, the shade will partially transmit the visible portion of incoming radiation (preferably about 10%), absorb a part of the incoming near infrared portion of the incoming solar energy (up to three microns) and reflect substantially all of the middle and far infrared energy, i.e., greater than three microns, away from structure 10. Such shades are well-known. See, for example, my U.S. Pat. Nos. 3,952,947; 4,018,214; 4,123,002; 4,201,189; and 4,296,733.

The second store 44 is provided near floor 14 preferably in the foundation of the structure below the floor. Store 44 is preferably a "di-thermal" store. Specifically, store 44 provides cooling of the air in the living spaces 16 when the air is sensed to be too hot. The store is used to prevent overheating and includes a portion which is warm and a portion which is cool and thus may be termed "di-thermal". Di-thermal store 44 preferably (1) is of an extremely large mass and has an extremely large thermal capacity; (2) has an extremely large surface area so that even a modest airflow can deliver or withdraw heat with little change in temperature in the store; (3) has such low heat conductivity with respect to downward heat flow (in the absence of forced airflow) and such large vertical dimension (e.g., 3 to 8 feet) that, in the absence of forced air flow, the uppermost part of the store can remain for approximately a week at a temperature considerably higher than that of the lowest part of the store; (4) is unaffected by moisture and heat and has a long-term useful life, for example, of 100 years; (5) is served by input and output air plenums 46 and 48, respectively, such that the hot air entering the store will enter at an upper location and will travel from the input 46, a relatively long distance within the store from the top to the bottom of the store before reaching the output 48; and (6) has a large interface area with the floor 14, and thus can keep floor 14 (and the air adjacent the floor) at about the same temperature as the uppermost region of the thermal mass provided by the store. An example of a store for use in a structure of the type thus far described and providing, at least in part, these objectives is the placement of about 100 tons of 1-to-3 inch diameter stones below the entire floor 14. The foundation walls 50 below floor 14 help define the store boundaries. The air input 46 is positioned on one side of the store, preferably at the top of the store at the northern wall of the structure 10 just below the exit opening 38 of the attic space 24. The output 48 is positioned at the opposite side of and at the bottom of the store, preferably adjacent the southern wall of structure 10 near the bottom of duct 42. A second duct 52 is also provided from the opening 48 to the living space 16A for transferring air from store 44 to living space 16A, when the damper 54 at the top of the duct is open. At typical times in winter, the uppermost and lowest portions of such a di-thermal store may be 63° F. to 70° F. and 50° F. to 60° F., respectively, although this can vary.

In accordance with one aspect of the present invention, automatic air flow is provided for controlling the temperature within the living spaces 16A and 16B using the stores 26 and 44. Preferably, the air duct 56 has an opening at or near the top of attic space 24, is mounted to transmit air through opening 38 and has an opening at its lower end connected to the input 46 of the store 44.

First means are provided for transmitting air through store 26 and second means are provided for transmitting air through the store 44. The first and second means preferably each comprise low power variable speed fans, with fan 58 preferably being positioned in or near opening 38 and fan 60 preferably being positioned in or near opening 46. Duct 56 also preferably includes means for allowing air to flow from store 26 through duct 56 into the living space 16 when only fan 58 is energized, means for allowing air to flow from living space 16 through duct 56 to store 44 when only fan 60 is energized, and means for providing air flow from store 26 through duct 56 to store 44 when both fans 58 and 60 are energized. The means for controlling such air flow includes a first damper 62 preferably positioned just below the floor 18 so as to open into the top of the lower living space 16A, and a second damper 64 preferably positioned just below ceiling 22 so as to open into the air duct 56. Damper 62 will automatically open and dampers 64 will automatically close when fan 58 is energized and fan 60 remains deenergized. Damper 64 will automatically open and damper 62 will automatically close when fan 60 is energized and fan 58 remains deenergized. Dampers 62 and 64 will both automatically close when both fans are energized, or both fans are deenergized. Duct 56 also includes means, preferably in the form of a door 66 movable between a first position during cold weather (for closing the duct 56 off from the outer conduit 68 connected to draw air in through the ground—see my U.S. Pat. Nos. 3,952,947; 4,018,214; 4,123,002; and 4,201,189 for such a conduit) and a second position during warm weather (for opening the duct 56 to the fresh air intake provided by outer conduit 68).

Control means is provided for selectively controlling the fans 58 and 60 in response to the temperature sensed within the living space 16. Preferably, the control means operates as a function of a preset temperature range wherein cooling is provided when the sensed temperature within living space 16 rises above the upper preset maximum limit and heating is provided when the sensed temperature within living space 16 falls below the lower preset minimum limit. The specific control means may be one of many different types of designs for providing the control under the conditions desired, as described hereinafter. By way of example, as shown in FIG. 1, a pair of temperature sensors 70 can be positioned generally within the living space 16 for sensing the level of the interior temperature relative to the respective upper and lower temperatures of the temperature preset range. The control means shown also includes a third sensor 72 disposed in attic space 22 above store 24 for sensing the temperature in the attic space and turning on both fans 58 and 60 so as to provide heat flow from the attic space 24 should the sensed level of the temperature at that location exceed a preset maximum limit.

Figure 2:
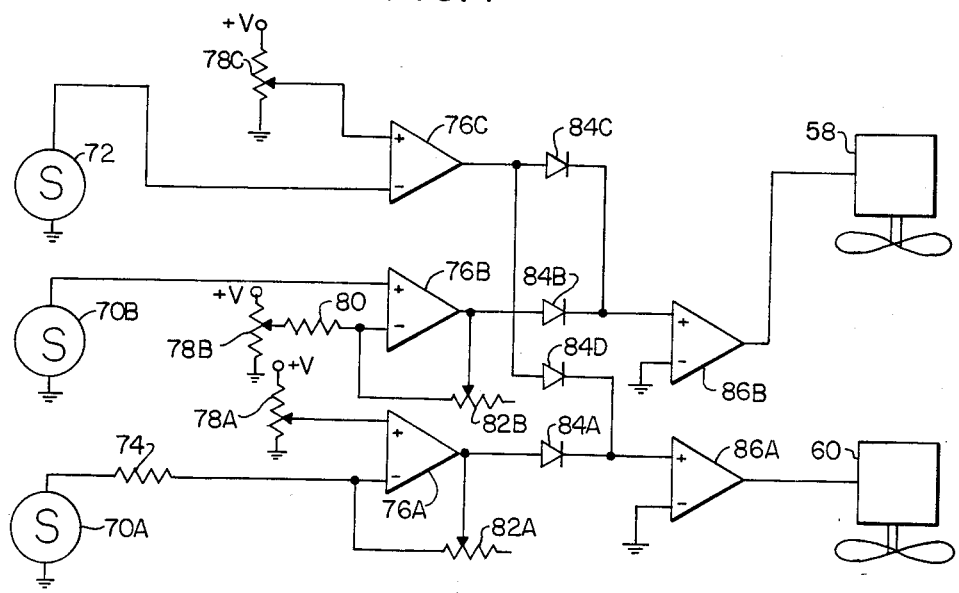
FIG. 2 is a schematic diagram of an embodiment of a thermostatically controlled fan system for use in the heating and cooling system of the present invention.

The control means shown in FIG. 2 includes the two sensors 70A and 70B for sensing the interior temperature relative to the respective higher and lower preset temperature limits of the predetermined temperature range and sensor 72 for sensing the interior temperature within the attic space 24 relative to the preset temperature limit (with the exception of sensors 70 and 72, the control means is not shown in FIG. 1, although it is positioned within the living space 16). Each of the sensors are two terminal devices which for the connections shown in FIGS. 2 and 3 must have output voltages which decrease as temperature increases. One terminal of each of the sensors is suitably grounded. The other terminal of the sensor 70A is connected through resistor 74 to the inverting input of operational amplifier 76A, while the other terminals of sensors 70B and 72 are connected to the respective noninverting input of amplifier 76B and the inverting input of amplifier 76C. The noninverting inputs of amplifier 76A and 76C are connected directly to the respective taps of potentiometers 78A and 78C, while the inverting input of amplifier 76B is connected through resistor 80 to the respective tap of potentiometer 78B. Potentiometer 78A is provided for setting the upper maximum temperature limit of the interior temperature range so that when the temperature sensed by sensor 70A falls below the preset upper limit, the control means generates an appropriate response (such as a power response or the speed generated being substantially proportional to the temperature deviation from the set point) so that the heating and cooling system provides cooling. Potentiometer 78B is provided for setting the lower minimum temperature limit of the temperature range so that when the temperature sensed by sensor 70B falls below the lower limit, the control means generates an appropriate response so that the heating and cooling system provides heating. Potentiometer 78C is provided for setting the maximum temperature limit of the attic space 24 so that when the temperature sensed by sensor 72 rises above the limit set, heat is transferred from the attic space to prevent overheating. The output of amplifier 76A is connected to the tap of potentiometer 82A, which forms with input resistor 74 an adjustable voltage divider. The output of amplifier 76B is connected to the tap of potentiometer 82B, which forms with input resistor 80 an adjustable voltage divider. The output of amplifiers 76A and 76B are connected to the corresponding anodes of diodes 84A and 84B, while the output of amplifier 76C is connected to the anodes of two diodes 84C and 84D. The cathodes of diodes 84A and 84D are connected together, and in turn are coupled to the noninverting input of amplifier 86A. The latter has its inverting input connected to ground. The cathodes of diodes 84B and 84C are connected together, and in turn are coupled to the non-inverting input of amplifier 86B. The latter has its inverting input connected to ground. The output of amplifiers 86A and 86B are connected to drive variable speed motors of fans 60 and 58, respectively.

In operation, the potentiometers 78A and 78B are set for the respective upper and lower limits of the range of desired temperatures of the interior living spaces 16, e.g., 67° F. and 73° F., respectively. The temperatures at which the attic space 24 is considered overheated is set by potentiometer 78C, e.g., above 130° F. The change of speed of motors 60 and 58 for a given change of temperature when individually energized in response to the interior temperature falling outside the range set by potentiometers 78A and 78B are set by potentiometers 82A and 82B, respectively. The speeds of fans 58 and 60 can be set to be identical or different for a given temperature difference from the starting set points determined by potentiometers 78A and 78B.

During winter months, the door 66 is closed to prevent air from being drawn in from outer conduit 68.

Should the temperature in living space 16 and sensed by sensor 70B drop below the lower temperature limit set by potentiometer 78B, the signal generated by sensor 70B will be less than that provided by potentiometer 78B and the output of amplifier 76B will provide a positive signal proportional to this difference so as to increase the level of the signal at the noninverting input to that at its inverting input. Thus, the lower the temperature sensed by sensor 70B (below that set by potentiometer 78B), the greater the voltage output of amplifier 76B. Diode 84B will be conductive so as to provide a positive input signal to amplifier 86B. A positive output signal is provided by amplifier 86B as a function of and preferably substantially proportional to the temperature differential between the temperature sensed by sensor 70B and that set by potentiometer 78B. Since the motor of fan 58 is variable speed, the greater the level of the signal provided at the output of amplifier 76B the faster the fan 58 will turn. Fan 60 remains deenergized so that, as shown in FIG. 1, air is drawn through the space 32 between panels 34 and 36, as well as directly from living space 16B through openings 28 and 30 (opening damper 31) into attic space 24 where it is heated, by store 26. Heated air rising toward the top of attic space 24 is forced by the fan 58 through duct 56. Air pressure is therefore increased in the duct causing damper 62 to open and heated air to be forced into the lower living space 16A. The heated air will find its way into the upper living spaces 16B through opening 20 so that the system provides additional heating to the living spaces 16. As the temperature sensed by sensor 70B rises toward the lower limit, the signal output of amplifier 86B will decrease and the speed of fan 58 will decrease until the interior temperature reaches the lower limit set by potentiometer 78B. Fan 58 will then be deenergized until the interior temperature falls below the minimum preset temperature or should the temperature sensed by sensor 72 in attic space 24 exceed the preset maximum as described hereinafter.

During the winter day, part of the solar energy is transmitted through the panels 34 and 36 into the living spaces 16.

Should the temperature sensed by sensor 70A in living space 16 exceed the maximum preset limit set by potentiometer 78A, the signal provided by sensor 70A will exceed that provided by potentiometer 78A. This results in a positive output signal of amplifier 76A and diode 84A being forward biased. The positive input signal to amplifier 86A is amplified and applied to the variable-speed motor of fan 60. The fan will turn at a speed as a function of and preferably substantially proportional to the amplitude of the signal level output of the amplifier 86A. Again the greater the signal level the faster the fan will turn.

Energizing fan 60, while fan 58 remains deenergized, results in a low pressure in duct 56 causing the damper 62 to remain closed and damper 64 to open. A substantial portion of the air drawn by fan 60 will thus be drawn from the living spaces 16 through damper 64 into duct 56, and transmitted by fan 60 through store 44. The latter will absorb heat from the air before exhausting the air through opening 48 and duct 52, out damper 54 into living space 16. This results in cooling down of the interior of living spaces 16. In this manner the control system tends to maintain the sensed temperature of the living spaces within the range or deadband set by potentiometers 78A and 78B.

Finally, since air heated in the space 32 between panels 34 and 36 will rise into the attic space 24 or the attic may be directly heated by solar energy as suggested in U.S. Pat. No. 4,296,733 the temperature in attic space 24, as sensed by sensor 72, may exceed the maximum limit set by potentiometer 78C, in which case the output of amplifier 76C will go positive. This results in both diodes 84C and 84D being forward biased so that signals are transmitted to both amplifiers 86A and 86B. The latter provides outputs to the motors of fans 58 and 60. With both fans energized, air is transmitted from attic space 24, through duct 56, through store 44 and opening 48 and through duct 42 through opening 40, up space 32 between panels 34 and 36 through opening 30 back into attic space 24. Air is also transmitted through duct 52 and damper 54 to living space 16 and from living space 16 through opening 28 into attic space 24. In order to avoid additional heating of the living space 16 by the sun shining through space 32, the shade 47 provided in space 32 can be drawn and thereby absorb the sun's energy. Shade 47 will transfer the absorbed heat to the air flowing up space 32 and hence into the store 26.

During the summer, the system operates in essentially the same manner except that door 66 is open to allow additional air to be drawn by fan 60 through outer conduit 68 when cooling the interior living spaces 16. On typical hot summer days the shade provided in space 32 can be drawn to prevent additional heating of the living spaces 16 by virtue of solar radiation being transmitted through panels 34 and 36. Additional venting in roof 12 or the ceiling of living space 16B can be provided to eliminate excess heat from attic space 24.

Figure 3:
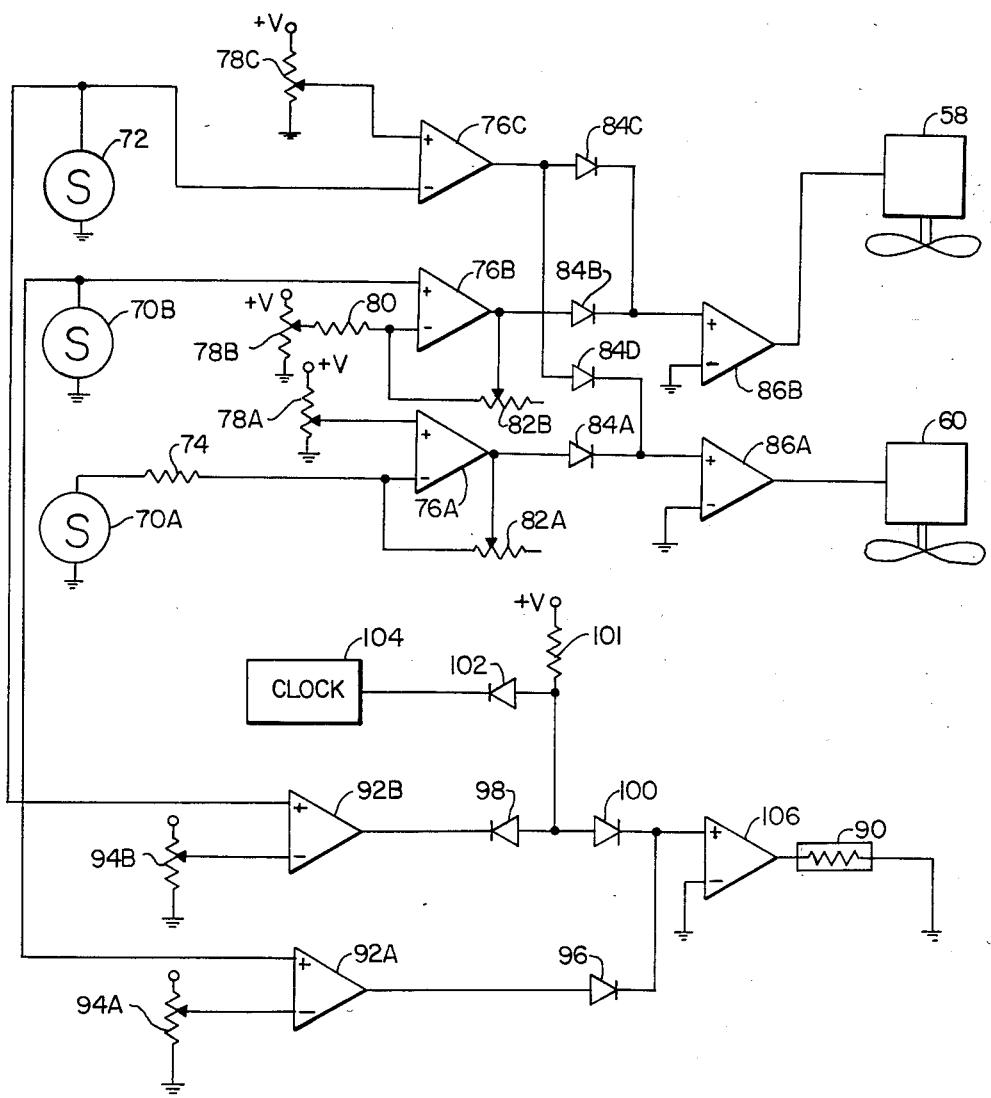
FIG. 3 is a schematic diagram of the FIG. 2 embodiment modified to provide the additional control function of providing complementary heat from an auxiliary source when the temperature sensed falls below a predetermined minimum.

The control system of FIG. 2 provides the control systems for a 100% solar heating and cooling system. It may, however, be desirable to provide a supplementary source of heat should the temperature sensed by the sensors fall below a predetermined minimum. More particularly, referring to FIG. 1, a heat source, such as the duct heater 90, is disposed in duct 56, or alternatively, a unit heater is disposed, for example, in attic space 24. The heater 90 is connected as shown in FIG. 3. More particularly, the control system shown in FIG. 3 includes the structure shown in FIG. 2, and in addition, includes means for energizing the heater when fan motor 58 reaches its top speed or when the temperature sensed by sensor 72 falls below a predetermined set point. Specifically, the sensor 70B is connected to the non-inverting input of amplifier 92A and sensor 72 is connected to the non-inverting input of amplifier 92B. The inverting input of amplifier 92A is connected to the tap of potentiometer 94A for setting the value of the temperature at which the fan 58 will be at full speed indicating the temperature sensed in living area 16 has fallen well below the set point. In this regard, the input of amplifier 92A can be taken directly from the output of amplifier 76B where a linear relationship exists between the temperature difference, sensed by these two amplifiers. The output of amplifier 92A is connected to the anode of diode 96. The output of amplifier 92B is connected to the cathode of diode 98. The anode of diode 98 is connected to the anodes of diodes 100 and 102. The anodes of diodes 98, 100 and 102 are connected to resistor 101 biased by a voltage source. The cathode of diode 102 is connected to clock 104 for controlling the time of day when the setting of potentiometer 94B is utilized. The cathode of diodes 96 and 100 are connected together and to the non-inverting input of a power switch 106, the inverting input of the latter being connected to system ground. The output of the amplifier provides an output to heater 90, the latter being suitably grounded.

In operation, when the temperature sensed by sensor 70B falls below the set point provided by potentiometer 94A, the fan 58 will be operating at full speed. The output of amplifier 92A will go positive, and diode 96 will become forward biased. This in turn results in the power switch 106 providing power to heater 90 so as to provide auxiliary heat to air being drawn through duct 56 by fan 58.

In order to turn the heater 90 on in response to the temperature sensed by sensor 72 in attic space 24 only during prescribed hours of the day, clock 104 is first set for the hours energy is to be purchased. During those times clock 104 will provide a positive output, and if the temperature sensed by sensor 72 is below that temperature set by potentiometer 92B, diodes 98 and 102 will be reversed biased and diode 100 will be forward biased by the current provided through resistor 101. The current is thus provided to power switch 106 turning heater 90 on. When the temperature rises above the set point provided by potentiometer 94B, the output of amplifier 92B goes negative resulting in the current from resistor 101 passing through diode 98 preventing switch 106 from being energized. Clock 104 thus can be used to purchase heat as needed or during off peak hours in anticipation of need.

The solar heating and cooling system thus described helps keep the interior temperature of living spaces 16, within a preset deadband. The deadband can easily be set by adjustment of potentiometers 78A and 78B. The use of variable speed motors for fans 58 and 60 enable a relatively smaller deadband to be set without being effected by unwanted transients and cycling, such as that attributed to control chatter. The gain or stiffness of the control system (i.e., that is the temperature difference between the set point and the sensed temperature at which the fan comes up to full speed) can, in part, be set by the adjustment of potentiometers 82A and 82B. Stores 26 and 44, respectively provide a relatively large heat source and heat sink so as to provide relatively reliable control of temperature. The modifications provided by FIG. 3 provide the additional advantage of being able to purchase energy should the speed of fan 58 approach the maximum speed or the temperature sensed in attic space 24 drop below some set point.

Certain changes may be made in the above system without departing from the scope of the present invention. For example, while two ducts 42 and 52 are shown for providing air conduits between the store 44 and the respective spaces 32 and 16A, a single duct with a door 54 can be used. In addition, while the control means of FIG. 2 for controlling the flow of air is shown, it will be evident that the control means can be constructed using only one temperature sensor 70.

Since certain other changes may be made in the above system without departing from the scope of the invention herein involved, it is intended that all matter contained in the above description or shown in the accompanying drawing shall be interpreted in an illustrative and not in a limiting sense.

I claim:

1. A heating and cooling system for use in an enclosed structure including an air space, said system comprising, in combination:

first store means for providing a source of heat and including a first heat transfer material for storing excessive heat;

second store means, disposed substantially below said first store means, for providing a heat sink and including a second heat transfer material for absorbing heat from air passing through said second store means; and temperature control means for maintaining the temperature within said air space substantially within a predetermined temperature range between first and second preselected levels of temperature, said temperature control means including first means for transmitting air through said first store means, means for selectively directing the flow of air either (a) from said first store means into said air space or (b) from said air space into said second store means, second means for transmitting air through said second store means, sensor means for sensing the level of temperature within said air space, wherein said temperature control means is operable in response to said sensor means in (1) a first mode of operation for heating said air space wherein said first means for transmitting air through said first store means and said means for selectively directing the flow of air heated by said first store means into said air space when the temperature sensed by said sensor means drops below said first preselected level; and (2) a second mode of operation for cooling said air space wherein said second means for transmitting air through said second store means and said means for selectively directing the flow of air from said air space to said second store means when the temperature level sensed by said sensor means rises above said second preselected level;

wherein said means for selectively directing the flow of air includes (i) common duct means connected between said first and second store means for transmitting air in said first and second modes of operation, (ii) first damper means adapted to open from said common duct means into said air space during said first mode of operation, and remain closed during said second mode of operation, and (iii) second damper means adapted to remain closed during said first mode of operation and open from said air space into said duct during said second mode of operation.

2. A system according to claim 1, wherein said first means for transmitting air transmits air at a first flow rate as a function of the difference the temperature level sensed by said sensor means is below said first preselected level and said second means for transmitting air transmits air at a second flow rate as a function of the difference the temperature level sensed by said sensor means is above said second preselected level.

3. A system according to claim 2, wherein said first and second flow rates are each selectively adjustable.

4. A system according to claim 3, wherein said first and second means for transmitting air are each fans.

5. A system according to claim 4, wherein said fans are each a variable speed fan whose speed varies as a function of the temperature level sensed by the respective first and second sensors and the corresponding first and second preselected levels.

6. A system according to claim 5, further including means for selectively varying said speed of each function of the temperature level sensed and corresponding preselected level.

7. A system according to claim 1, wherein said temperature control means includes means for adjusting first and second preselected levels of temperature.

8. A system according to claim 7, wherein said sensor means includes means for generating at least one temperature-related signal as a function of the temperature level in said air space and said temperature control means includes means for generating a pair of reference signals as a function of the respective first and second preselected levels of temperature, means for comparing said temperature-related signal with each of said reference signals, and means for generating a first signal to said first means for transmitting air when said temperature-related signal drops below said first reference signal and a second signal to said second means for transmitting air when said temperature-related signal exceeds said second reference signal.

9. A system according to claim 1, further including means for transferring heat from said first store to said second store when the temperature in the vicinity of said first store exceeds a third preselected temperature level.

10. A system according to claim 1, further comprising auxiliary heater means for generating heat in response to a power signal, means for coupling said temperature control means to said auxiliary heater means said temperature control means being operable in a third mode for heating said air space wherein said first means for transmitting air through said first store means transmits air heated by said first store means and said auxiliary heater means into said air space when the temperature sensed by said sensor means drops below a third preselected level, said third preselected level being lower than said first preselected level.

11. A system according to claim 10, wherein said temperature control means includes second sensor means positioned in the vicinity of said first store, and said temperature control means is operable in said third mode when the temperature sensed by said second sensor means drops below a fourth preselected level.

12. A system according to claim 10, wherein said means for coupling said temperature control means to said auxiliary heater means include clocking means for selectively coupling said temperature control means to said auxiliary heater means as a function of time of day.

13. A heating and cooling system for use in an enclosed structure including an air space, said system comprising, in combination:

first store means for providing a source of heat and including a first heat transfer material for storing excessive heat;

second store means for providing a heat sink and including a second heat transfer material for absorbing heat from air passing through said second store means; and temperature control means for substantially maintaining the temperature within said air space within a predetermined temperature range between first and second preselected levels of temperatures, said temperature control means including first means for transmitting air through said first store means, second means for transmitting air through said second store means, means for transferring heat from said first store means to said second store means when the temperature in the vicinity of said first store means exceeds a third preselected temperature level, first sensor means for sensing the level of temperature within said air space, and second sensor means positioned in the vicinity of said first store means, wherein said temperature control means is operable in response to (A) said first sensor means in (1) a first mode of operation for heating said air space wherein said first means for transmitting air through said first store means transmits air heated by said first store means into said air space when the temperature sensed by said sensor means drops below said first preselected level; and (2) a second mode of operation for cooling said air space wherein said second means for transmitting air through said second store means transmits air from said air space to said second store means when the temperature level sensed by said sensor means rises above said second preselected level, and (B) said second sensor means in a third mode of operation wherein said first and second means for transmitting air are both responsive to said second sensor means so that said first and second means for transmitting air transmit air through said first store into said second store.

* * * * *